US008429311B2

(12) United States Patent
Koenigseder et al.

(10) Patent No.: US 8,429,311 B2
(45) Date of Patent: Apr. 23, 2013

(54) PROCESS FOR THE TRANSFER OF DATA INTO SEVERAL CONTROL DEVICES

(75) Inventors: Thomas Koenigseder, Wilfling (DE); Martin Baumgartner, Zorneding (DE); Mohamed Majdoub, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 342 days.

(21) Appl. No.: 12/552,876

(22) Filed: Sep. 2, 2009

(65) Prior Publication Data
US 2009/0327534 A1  Dec. 31, 2009

Related U.S. Application Data

(63) Continuation of application No. PCT/EP2008/001772, filed on Mar. 6, 2008.

(30) Foreign Application Priority Data

Mar. 29, 2007 (DE) .......................... 10 2007 015 122

(51) Int. Cl.
*G06F 3/00* (2006.01)
(52) U.S. Cl.
USPC ............. 710/11; 710/1; 710/3; 710/4; 710/5; 710/7; 710/15; 710/20; 710/30; 710/58; 710/60; 710/61; 710/64
(58) Field of Classification Search .................. 710/1, 3, 710/4, 5, 7, 11, 15, 20, 30, 58, 60, 61, 64
See application file for complete search history.

(56) References Cited

U.S. PATENT DOCUMENTS

| 6,213,567 | B1 * | 4/2001 | Zittlau et al. ..................... 303/20 |
| 6,643,574 | B1 * | 11/2003 | Swart et al. ...................... 701/45 |

(Continued)

FOREIGN PATENT DOCUMENTS

| DE | 100 09 366 A1 | 9/2000 |
| DE | 100 05 154 A1 | 8/2001 |

(Continued)

OTHER PUBLICATIONS

German Search Report dated Nov. 20, 2007 including partial English translation (Nine (9) pages.).
International Search Report dated Sep. 3, 2008 including English translation (Four (4) pages).

*Primary Examiner* — Idriss N Alrobaye
*Assistant Examiner* — Jasjit Vidwan
(74) *Attorney, Agent, or Firm* — Crowell & Moring LLP

(57) ABSTRACT

A process is provided for transferring a first sequence control and/or first data into a first control device and a second sequence control and/or second data into a second control device in a motor vehicle. The transfer is carried out by way of a first data bus while using a first transmission protocol which has a data frame with a predetermined frame format or message format, and the transfer as a whole takes place by the transmission of a plurality of data frames. In a first step, by way of a first data frame, a portion of the first sequence control and/or of the first data is transmitted to the first control device. In a second step, by way of the second data frame, a portion of the second sequence control and/or of the second data is transmitted to the second control device.

11 Claims, 1 Drawing Sheet

U.S. PATENT DOCUMENTS

| | | | |
|---|---|---|---|
| 7,017,072 B1* | 3/2006 | Barrenscheen et al. | 714/4.2 |
| 7,739,451 B1* | 6/2010 | Wiedenman et al. | 711/118 |
| 2003/0225461 A1* | 12/2003 | Schmidt | 700/1 |
| 2006/0112315 A1* | 5/2006 | Pfeufer et al. | 714/47 |
| 2006/0179192 A1 | 8/2006 | Ganasan et al. | |
| 2007/0174684 A1 | 7/2007 | Englert et al. | |
| 2007/0208469 A1* | 9/2007 | Wille et al. | 701/36 |
| 2010/0182037 A1* | 7/2010 | Bosch et al. | 324/772 |

FOREIGN PATENT DOCUMENTS

| | | |
|---|---|---|
| DE | 103 41 514 A1 | 4/2005 |
| DE | 103 60 125 A1 | 7/2005 |
| EP | 1 265 401 A1 | 12/2002 |

* cited by examiner

PROCESS FOR THE TRANSFER OF DATA INTO SEVERAL CONTROL DEVICES

CROSS-REFERENCE TO RELATED APPLICATIONS

This application is a continuation of PCT International Application No. PCT/EP2008/001772, filed Mar. 6, 2008, which claims priority under 35 U.S.C. §119 to German Patent Application No. DE 10 2007 015 122.7, filed Mar. 29, 2007, the entire disclosures of which are herein expressly incorporated by reference.

BACKGROUND AND SUMMARY OF THE INVENTION

The invention particularly relates to a process for the transfer of a first sequence control and/or of first data into a first control device and of a second sequence control and/or of second data into a second control device in a motor vehicle, which are each connected by way of a first data bus with a transmission device. The transmission device is preferably a vehicle-external transmission device. The transfer is carried out by way of the first data bus while using a first transmission protocol. The first transmission protocol has a data frame with a predetermined frame format or message format, and the transfer is entirely carried out by the transmission of a plurality of data frames.

In the case of a current process, a sequence control to be transferred into a control device is divided into several data packages. The size of the data packages depends on the size of a buffer memory provided in the control device. Such a data package is placed on a data bus in the vehicle by a vehicle-external transmission device, to which data bus the respective control device is connected. The data package will write into the buffer memory until the latter is full, and only then will the control device open-up the bus again. The rather slow writing operation impairs the data transfer by way of the data bus.

It is therefore an object of the invention, in particular, to provide a process by which large quantities of data can be transferred rapidly into the control devices of a vehicle.

This object is achieved by a process for the transfer of a first sequence control and/or of first data into a first control device and of a second sequence control and/or of second data into a second control device in a motor vehicle, which are each connected by way of a first data bus with a transmission device. The transmission device is preferably a vehicle-external transmission device. The transfer is carried out by way of the first data bus while using a first transmission protocol. The first transmission protocol has a data frame with a predetermined frame format or message format, and the transfer is entirely carried out by the transmission of a plurality of data frames. In a first step, by way of a first data frame, a portion of the first sequence control and/or of the first data is transmitted to the first control device. And, immediately thereafter, in a second step, by way of the second data frame, a portion of the second sequence control and/or of the second data is transmitted to the second control device. Advantageous further developments of the invention are disclosed herein.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
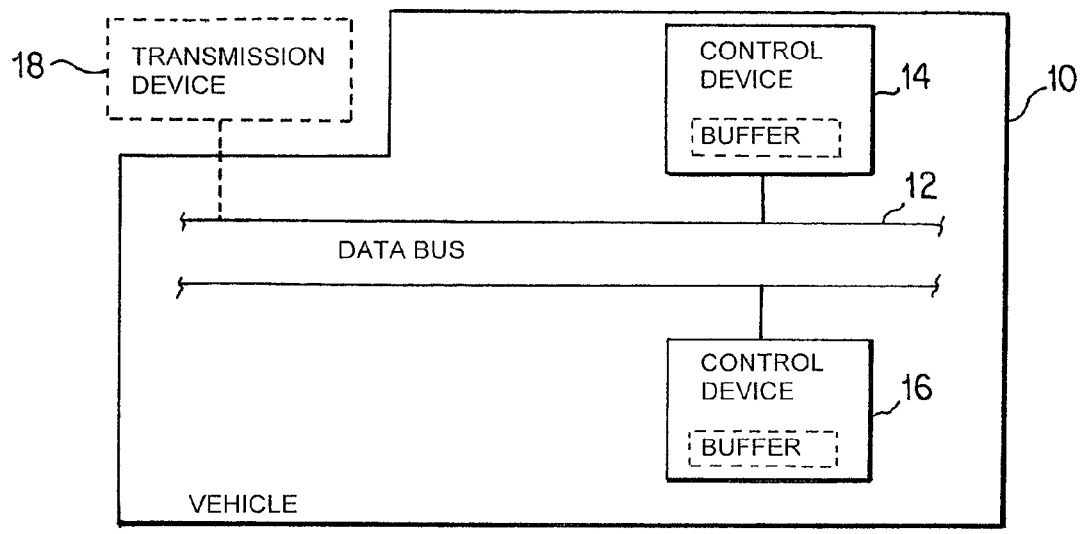
FIGS. 1a and 1b illustrate a bus system for a motor vehicle and the process for transferring data to several control devices of the motor vehicle, respectively, in accordance with an embodiment of the invention.
Figure 1B:
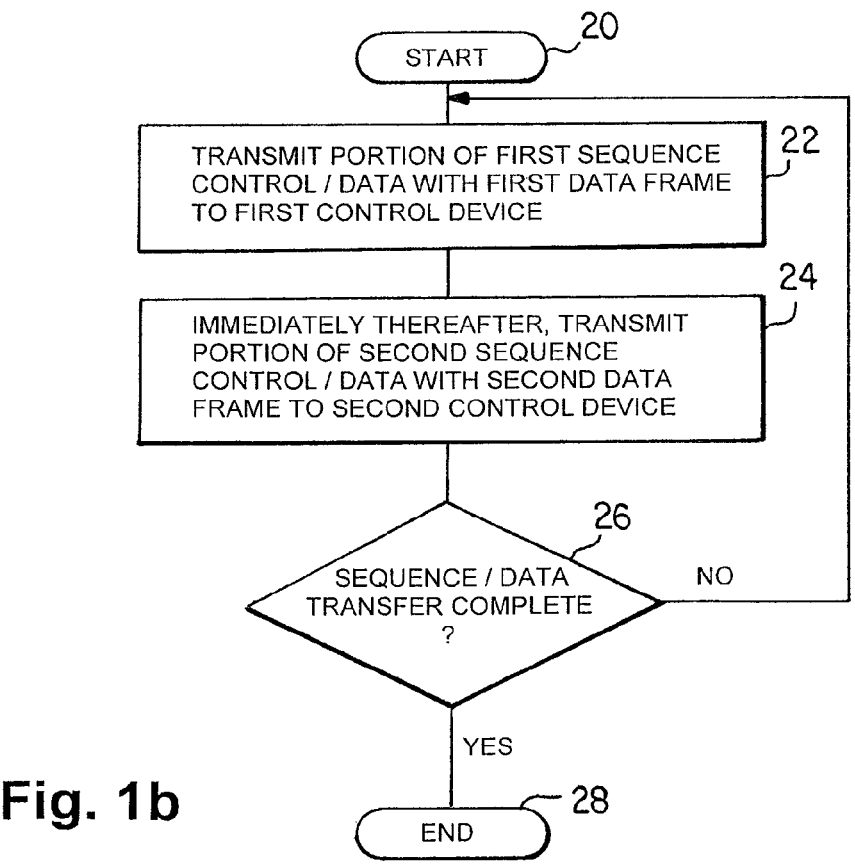

Referring to the figures, a vehicle 10 includes a data bus 12 to which at least first and second control devices 14, 16 are coupled. A transmission device 18, which is preferably located outside of the vehicle, is operatively coupleable with the data bus 12 to transmit at least first and second sequence controls and data to the respective control devices 14, 16.

According to an aspect of the invention, upon starting the process at step 20, in a first step 22, by way of a first data frame, a portion of the first sequence control and/or of the first data is transmitted to the first control device. Directly after, in a second step 24, by way of the second data frame, a portion of the second sequence control and/or of the second data is transmitted to the second control device. The data frame has the predetermined frame format or message format of the transmission protocol used for the bus transfer. This operation may be repeated (step 26) until the transfer is complete (step 28).

Advantageously, in each case, only a data quantity adapted to the corresponding transmission protocol is always transmitted successively to the control devices to be addressed. This protocol-dependent data quantity is optimal for the corresponding data bus because the ratio of "overhead" data to "useful" data is particularly favorable. The buffer memories of the control devices can rapidly remove this small quantity of data from the data bus so that the data bus will be opened-up again rapidly. Immediately thereafter, the other control devices also will be supplied with data with only very brief pauses, which permits a very stable programming process of the control devices.

In an advantageous further development, it is provided that the vehicle-external transmission device makes available a sequence of first and second data frames until the first sequence control and/or the first data have been transmitted completely into the first control device, and subsequently transmits only second data frames of the second sequence control and/or of the second data into the control device.

In one embodiment of the invention, a temporarily storing buffer memory for storing a plurality of first data frames is provided in the first control device, and a data package durably stored in the first control device is formed from the plurality of first data frames by the first control device.

In another embodiment of the invention, analogously a temporarily storing buffer memory for storing a plurality of second data frames is provided in the second control device. A data package durably stored in the second control devices is formed by the second control device from the plurality of second data frames.

In a further development, it is provided that the first control device and/or the second control device checks immediately after receiving a corresponding data frame whether the latter has been received correctly. Otherwise, it requests the corresponding data frame again from the transmission device, and the latter transmits the corresponding data frame again to the corresponding control device.

In a preferred embodiment, the corresponding data frame is transmitted in a privileged manner in terms of time in comparison to other data frames for the corresponding control device. By means of this "error handling", the programming process will be stabilized and accelerated.

A bus system of a motor vehicle having at least one first data bus and several control devices may carry out the process according to the invention. Such a bus system preferably is a system having at least one CAN bus and/or a MOST bus, which use corresponding standardized protocols for the data transmission. In the case of these known automotive bus systems, CAN is the abbreviation for "Controller Area Network" and MOST is the abbreviation for "Media Oriented Systems Transport."

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for transferring at least one of a first sequence control and first data into a first control device of a motor vehicle and at least one of a second sequence control and second data into a second control device of the motor vehicle, the first and second control devices each being connected via a first data bus with a transmission device that is vehicle-external, wherein the transfer process is carried out via the first data bus using a first transmission protocol having a data frame with a predetermined frame format or message format, the transfer being entirely carried out by transmission of a plurality of data frames, the process comprising:
    in a first step, transmitting only a portion of the at least one of the first sequence control and the first data to the first control device by way of a first data frame, wherein a first data quantity of the portion of the at least one of the first sequence control and the first data is based on the first transmission protocol; and
    immediately thereafter, in a second step, and before an entirety of the at least one of the first sequence control and the first data has been transmitted to the first control device, transmitting a portion of the at least one of the second sequence control and the second data to the second control device by way of the second data frame, wherein a second data quantity of the portion of the at least one of the second sequence control and the second data is based on the first transmission protocol; and
    transmitting, before an entirety of the at least one of the second sequence control and the second data has been transmitted to the second control device, transmitting the additional portion of the at least one of the first sequence control and the first data to the first control device.

2. The process according to claim 1, wherein the transmission device is operatively configured to:
    make available a sequence of first and second data frames until the at least one of the first sequence control and the first data have been transmitted completely into the first control device; and
    subsequently transmit only the second data frames of the at least one of the second sequence control and the second data into the second control device.

3. The process according to claim 2, further comprising:
    storing a plurality of first data frames in a temporary storage buffer memory in the first control device; and
    forming, by the first control device, a durably stored data package in the first control device.

4. The process according to claim 2, further comprising:
    storing a plurality of second data frames in a temporary storage buffer memory in the second control device; and
    forming, by the second control device, a durably stored data package in the second control device.

5. The process according to claim 1, further comprising:
    storing a plurality of first data frames in a temporary storage buffer memory in the first control device; and
    forming, by the first control device, a durably stored data package in the first control device.

6. The process according to claim 5, further comprising:
    storing a plurality of second data frames in a temporary storage buffer memory in the second control device; and
    forming, by the second control device, a durably stored data package in the second control device.

7. The process according to claim 1, further comprising:
    storing a plurality of second data frames in a temporary storage buffer memory in the second control device; and
    forming, by the second control device, a durably stored data package in the second control device.

8. The process according to claim 1, wherein at least one of the first control device and the second control device checks immediately after receiving a corresponding data frame whether the corresponding data frame was received correctly; and
    if the corresponding data frame has not been received correctly, the respective control device requests the corresponding data frame again from the transmission device, which again transmits the corresponding data frame to the respective control device.

9. The process according to claim 8, wherein the corresponding data frame requested to be transmitted again is transmitted in a higher priority manner in terms of time, in comparison to other data frames for the corresponding control device.

10. A motor vehicle, comprising:
    a bus system arranged in the motor vehicle, the bus system including at least one first data bus and at least first and second control devices operatively coupled to the first data bus for receiving transmissions from a vehicle-external transmission device;
    wherein at least one of a first sequence control and first data is transferable into the first control device of a motor vehicle and at least one of a second sequence control and second data is transferable into the second control device of the motor vehicle, the transfer being carried out via the first data bus using a first transmission protocol having a data frame with a predetermined frame format or message format, wherein the transfer is entirely carried out by transmission of a plurality of the data frames by, in a first step, transmitting only a portion of the at least one of the first sequence control and the first data to the first control device by way of a first data frame, wherein a first data quantity of the portion of the at least one of the first sequence control and the first data is based on the first transmission protocol; and
    immediately thereafter, in a second step, and before an entirety of the at least one of the first sequence control and the first data has been transmitted to the first control device, transmitting a portion of the at least one of the second sequence control and the second data to the second control device by way of the second data frame, wherein a second data quantity of the portion of the at least one of the second sequence control and the second data is based on the first transmission protocol,
    wherein, before an entirety of the at least one of the second sequence control and the second data has been transmitted to the second control device, the additional portion of the at least one of the first sequence control and the first data is transmitted to the first control device.

11. The motor vehicle according to claim 10, wherein the first data bus is one of a CAN bus or a MOST bus.

\* \* \* \* \*